United States Patent
Lei et al.

(10) Patent No.: US 12,490,264 B2
(45) Date of Patent: Dec. 2, 2025

(54) TRIGGERING HARQ-ACK REPORTING ON UNLICENSED SPECTRUM

(71) Applicant: LENOVO (BEIJING) LIMITED, Beijing (CN)

(72) Inventors: Haipeng Lei, Beijing (CN); Alexander Golitschek Edler von Elbwart, Darmstadt (DE)

(73) Assignee: Lenovo (Beijing) Limited, Beijing (CN)

( * ) Notice: Subject to any disclaimer, the term of this patent is extended or adjusted under 35 U.S.C. 154(b) by 757 days.

(21) Appl. No.: 17/276,133

(22) PCT Filed: Sep. 28, 2018

(86) PCT No.: PCT/CN2018/108406
§ 371 (c)(1),
(2) Date: Mar. 13, 2021

(87) PCT Pub. No.: WO2020/062055
PCT Pub. Date: Apr. 2, 2020

(65) Prior Publication Data
US 2022/0053537 A1 Feb. 17, 2022

(51) Int. Cl.
*H04W 72/12* (2023.01)
*H04L 1/1812* (2023.01)
(Continued)

(52) U.S. Cl.
CPC ........... *H04W 72/20* (2023.01); *H04L 1/1816* (2013.01); *H04L 5/0055* (2013.01)

(58) Field of Classification Search
None
See application file for complete search history.

(56) References Cited

U.S. PATENT DOCUMENTS

2013/0034073 A1\* 2/2013 Aiba ................... H04W 52/325
370/329
2016/0295561 A1\* 10/2016 Papasakellariou .... H04W 72/23
(Continued)

FOREIGN PATENT DOCUMENTS

CN 102237989 A 11/2011
CN 103490864 A 1/2014
(Continued)

OTHER PUBLICATIONS

International Searching Authority, "Notification of Transmittal of the International Search Report and the Written Opinion of the International Searching Authority, or the Declaration", PCT/CN2018/108406, Sep. 28, 2018, pp. 1-6.
(Continued)

*Primary Examiner* — Jeffrey M Rutkowski
*Assistant Examiner* — Mehedi S Aley
(74) *Attorney, Agent, or Firm* — Kunzler Bean & Adamson

(57) ABSTRACT

Methods and apparatuses for triggering HARQ-ACK feedback. A method comprising: receiving a first Downlink Control Information (DCI) from a base unit for scheduling a Downlink (DL) transmission, wherein the first DCI includes a first indicator indicating to suspend transmission of a Hybrid Automatic Repeat Request Acknowledgement (HARQ-ACK) feedback corresponding to the DL transmission; receiving a second DCI from the base unit for scheduling the transmission of the HARQ-ACK feedback, wherein the second DCI indicates a resource for the transmission of the HARQ-ACK feedback; and transmitting the HARQ-ACK feedback to the base unit on the resource indicated by the second DCI.

20 Claims, 4 Drawing Sheets

(51) Int. Cl.
*H04L 5/00* (2006.01)
*H04W 72/20* (2023.01)

(56) References Cited

U.S. PATENT DOCUMENTS

| | | | | |
|---|---|---|---|---|
| 2017/0222749 | A1* | 8/2017 | Dinan | H04L 5/0051 |
| 2017/0273056 | A1* | 9/2017 | Papasakellariou | H04W 52/44 |
| 2018/0027547 | A1* | 1/2018 | Lyu | H04W 72/51 |
| | | | | 370/329 |
| 2019/0132093 | A1* | 5/2019 | Aiba | H04L 1/1861 |
| 2019/0222394 | A1* | 7/2019 | Medles | H04L 5/0055 |
| 2019/0230691 | A1* | 7/2019 | Cao | H04L 5/0044 |
| 2019/0306841 | A1* | 10/2019 | Huang | H04L 5/0055 |
| 2019/0342037 | A1* | 11/2019 | Karaki | H04L 1/1854 |
| 2020/0044792 | A1* | 2/2020 | Vaidya | H04L 47/34 |
| 2021/0344451 | A1* | 11/2021 | Hedayat | H04L 1/1861 |

FOREIGN PATENT DOCUMENTS

| | | | | |
|---|---|---|---|---|
| CN | 103873212 A | | 6/2014 | |
| CN | 106612557 A | * | 5/2017 | H04L 5/0055 |
| WO | 2016182373 A1 | | 11/2016 | |

OTHER PUBLICATIONS

Intel Corporation, "Selection of CAT-4 LBT priority class for eLAA", 3GPP TSG-RAN WG2 #94, R2-163608, May 23-27, 2016, pp. 1-4, Nanjing, China.

NTT Docomo, Inc., "DL/UL scheduling and HARQ management", 3GPP TSG RAN WG1 Meeting 90bis, R1-1718217, Oct. 9-13, 2017, pp. 1-14, Prague, CZ.

NTT Docomo, Inc., "HARQ-ACK feedback", 3GPP TSG RAN WG1 NR Ad-Hoc#3, R1-1716105, Sep. 18-21, 2017, pp. 1-11, Nagoya, Japan.

Samsung, "HARQ enhancements for NR-U", 3GPP TSG RAN WG1 Meeting #94, R1-1808770, Aug. 20-24, 2018, pp. 1-6, Gothenburg, Sweden.

Qualcomm Incorporated, "Enchancements to Scheduling and HARQ operation for NR-U", 3GPP TSG RAN WG1 Meeting #94, R1-1809481, Aug. 20-Aug. 24, 2018, pp. 1-7, Gothenburg, Sweden.

* cited by examiner

TRIGGERING HARQ-ACK REPORTING ON UNLICENSED SPECTRUM

FIELD

The subject matter disclosed herein generally relates to wireless communications, and more particularly relates to new radio (NR) access on unlicensed spectrum (NR-U).

BACKGROUND

The following abbreviations are herewith defined, some of which are referred to within the following description: Third Generation Partnership Project (3GPP), Cyclic Redundancy Check (CRC), Downlink (DL), Evolved Node B (eNB), European Telecommunications Standards Institute (ETSI), Enhanced Interference Management and Traffic Adaptation (eIMTA), Frequency Division Duplex (FDD), Frequency Division Multiple Access (FDMA), Hybrid Automatic Repeat Request Acknowledgement (HARQ-ACK), Long Term Evolution (LTE), Multiple Access (MA), Next Generation Node B (gNB), New Radio (NR), Negative Acknowledgement (NACK), Orthogonal Frequency Division Multiplexing (OFDM), Physical Resource Block (PRB), Physical Downlink Shared Channel (PDSCH), Physical Uplink Control Channel (PUCCH), Physical Uplink Shared Channel (PUSCH), Positive Acknowledgement (ACK), Radio Resource Control (RRC), Reference Signal (RS), Single Carrier Frequency Division Multiple Access (SC-FDMA), System Information (SI), Signal to Interference plus Noise Ratio (SINR), Transport Block (TB), Time-Division Duplex (TDD), Time Division Multiplex (TDM), User Entity/Equipment (Mobile Terminal) (UE), Uplink (UL), Uplink Control Information (UCI), Universal Mobile Telecommunications System (UMTS), Ultra Reliable & Low Latency Communication (URLLC) and Worldwide Interoperability for Microwave Access (WiMAX), Downlink Control Information DCI), Code Block (CB), Code Block Group (CBG), Downlink Assignment Index (DAI), CBG transmission information (CBGTI), New Data Indicator (NDI), Semi-Persistent Scheduling (SPS), Listen-Before-Talk (LBT), Channel Occupancy Time (COT) and Downlink Association Set (DAS).

In LTE LAA, a HARQ-ACK feedback is transmitted via PUCCH or PUSCH on a licensed carrier. However, for NR access on an unlicensed spectrum, a HARQ-ACK feedback is required to be transmitted in Dual-connectivity (DC), CA or standalone deployment scenarios, which have been included in the target deployment scenarios for NR access on unlicensed spectrum (NR-U).

When a HARQ-ACK feedback is to be transmitted on an unlicensed carrier, LBT need to be performed first before transmitting the HARQ-ACK feedback. The UE can start HARQ-ACK transmission only if the LBT is successful; otherwise, the UE has to give up transmitting the HARQ-ACK feedback. If the UE fails to transmit HARQ-ACK feedback due to an LBT failure, the gNB has to retransmit the corresponding PDSCHs since it has no knowledge about the decoding results of the PDSCHs at the UE side.

Additionally, transmission of a HARQ-ACK feedback on an unlicensed carrier may suffer potential interference from other nodes hidden from the current node. Even if the UE has successfully transmitted the HARQ-ACK feedback, it may still be possible that the gNB fails to decode it. From the gNB's perspective, if the gNB fails to detect a HARQ-ACK feedback in the predefined HARQ-ACK feedback timing, the gNB will have to assume NACK and retransmit all the corresponding PDSCHs. Both LBT failure and hidden node problem may lead to unnecessary DL retransmission and DL performance degradation due to failed HARQ-ACK reception at the gNB side.

BRIEF SUMMARY

Methods and apparatuses for triggering HARQ-ACK feedback are disclosed.

One aspect of the disclosure is directed to a method, the method comprising: receiving a first DCI from a base unit for scheduling a DL transmission, wherein the first DCI includes a first indicator indicating to suspend transmission of a HARQ-ACK feedback corresponding to the DL transmission; receiving a second DCI from the base unit for scheduling the transmission of the HARQ-ACK feedback, wherein the second DCI indicates a resource for the transmission of the HARQ-ACK feedback; and transmitting the HARQ-ACK feedback to the base unit on the resource indicated by the second DCI.

In some embodiments, the first indicator may indicate a predefined HARQ timing value for suspending the transmission of the HARQ-ACK feedback, or a predefined PUCCH resource for suspending the transmission of the HARQ-ACK feedback. The first indicator may comprise one bit for indicating suspension of the transmission of the HARQ-ACK feedback. The first indicator may also comprise a counter DAI and a total DAI, and the value of total DAI may be the total number of transmissions with a corresponding HARQ-ACK feedback in the same HARQ-ACK codebook of the DL transmission, and the method may further comprise: determining to suspend the transmission of the HARQ-ACK feedback in response to the value of counter DAI being smaller than the value of total DAI, and determining to transmit the HARQ-ACK feedback in response to the value of counter DAI being equal to the value of total DAI.

In some embodiments, the first DCI may include a HARQ-ACK codebook index, and the value of the HARQ-ACK codebook index may be updated based on another HARQ-ACK codebook. The bit length of the HARQ-ACK codebook index may be determined based on RRC signaling.

In some embodiments, the second DCI may include the second HARQ-ACK codebook index for scheduling transmission of the corresponding HARQ-ACK codebook.

In some embodiments, the second DCI may schedule transmission of a HARQ-ACK feedback for a HARQ process by indicating the corresponding HARQ process ID of the HARQ process in the second DCI. The second DCI may include one field for indicating a starting HARQ process ID and another field for indicating a number of contiguous HARQ processes. The second DCI may include one field for indicating a starting HARQ process ID and a number of contiguous HARQ processes.

In some embodiments, the HARQ-ACK feedback may be included in a first HARQ-ACK codebook and the transmission of the first HARQ-ACK codebook may be suspended in response to the first indicator indicating to suspend the first HARQ-ACK codebook; and the second DCI may schedule the transmission of the first HARQ-ACK codebook and retransmission of a second HARQ-ACK codebook, wherein the previous transmission of the second HARQ-ACK codebook was not correctly received by the base unit. The first and second HARQ-ACK codebooks may be transmitted in one UCI, or in two separate UCIs.

In some embodiments, the first DCI may include a field for indicating LBT type for the transmission of the HARQ-ACK feedback. The first DCI may include a field for indicating LBT priority class for the transmission of the HARQ-ACK feedback.

In some embodiments, the second DCI may include a field for indicating LBT type for the transmission of the HARQ-ACK feedback. The second DCI may include a field for indicating LBT priority class for the transmission of the HARQ-ACK feedback.

Another aspect of the disclosure is directed to a method, the method comprising: transmitting a first DCI for scheduling a DL transmission, wherein the first DCI includes a first indicator indicating to suspend transmission of a HARQ-ACK feedback corresponding to the DL transmission; transmitting a second DCI for scheduling the transmission of the HARQ-ACK feedback, wherein the second DCI indicates a resource for the transmission of the HARQ-ACK feedback; and receiving the HARQ-ACK feedback transmitted on the resource indicated by the second DCI.

Yet another aspect of the disclosure is directed to an apparatus, the apparatus comprising: a receiver that receives a first DCI for scheduling a DL transmission, wherein the first DCI includes a first indicator indicating to suspend transmission of a HARQ-ACK feedback corresponding to the DL transmission; and receives a second DCI for scheduling the transmission of the HARQ-ACK feedback, wherein the second DCI indicates a resource for the transmission of the HARQ-ACK feedback; and a transmitter that transmits the HARQ-ACK feedback on the resource indicated by the second DCI.

Yet another aspect of the disclosure is directed to an apparatus, the apparatus comprising: a transmitter that transmits a first DCI for scheduling a DL transmission, wherein the first DCI includes a first indicator indicating to suspend transmission of a HARQ-ACK feedback corresponding to the DL transmission; and transmits a second DCI for scheduling the transmission of the HARQ-ACK feedback, wherein the second DCI indicates a resource for the transmission of the HARQ-ACK feedback; and a receiver that receives the HARQ-ACK feedback transmitted on the resource indicated by the second DCI.

BRIEF DESCRIPTION OF THE DRAWINGS

A more detailed description of the embodiments briefly described above will be specified and illustrated in the appended drawings. With the caveat that these drawings depict only some embodiments, and should not therefore limit their scope, the embodiments will be described and explained with additional specificity and detail through the use of the accompanying drawings, in which.

DETAILED DESCRIPTION

Figure 1:
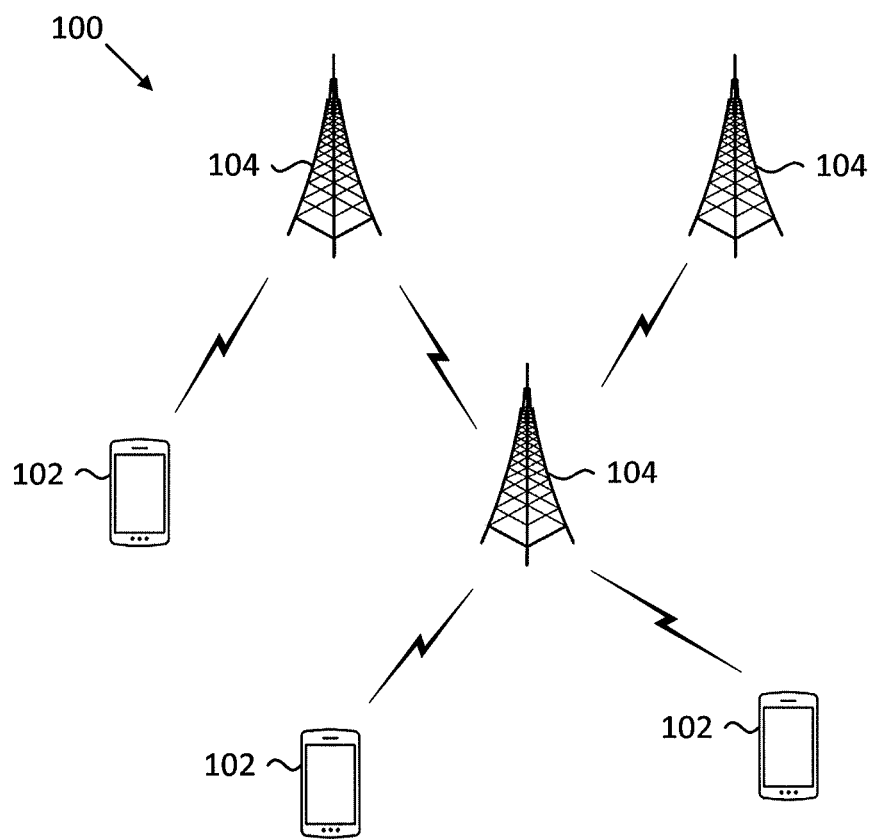
FIG. 1 is a schematic block diagram illustrating one embodiment of a wireless communication system for retransmitting uplink control information.

As those familiar in the field will be aware, aspects of the embodiments may be embodied as a system, apparatus, method, or program product. Accordingly, embodiments may be comprised entirely of hardware, entirely of software (including firmware, resident software, micro-code, etc.) or a hybrid that may generally all be referred to herein as a "circuit", "module" or "system". Furthermore, embodiments may take the form of a program product embodied in one or more computer readable storage devices storing machine-readable code, computer readable code, and/or program code, referred to hereafter as "code". The storage devices may be tangible, non-transitory, and/or non-transmission. The storage devices may not embody signals. In a certain embodiment, the storage devices only employ signals for accessing code.

Certain functional units described in this specification may be labeled as "modules", in order to more particularly emphasize their independent implementation. For example, a module may be implemented as a hardware circuit comprising custom very-large-scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or similar.

Modules may also be implemented in code and/or software for execution by various types of processors. An identified module of code may, for instance, include one or more physical or logical blocks of executable code which may be organized as an object, procedure, or function. Nevertheless, the executables of an identified module need not be physically located together, but may include disparate instructions stored in different locations which, when joined logically together, include the module and achieve the stated purpose for the module.

A module of code may be a single or many instructions, and may even be distributed over several different code segments, among different programs, and across several memory devices. Similarly, operational data may be identified and illustrated herein within modules, and may be embodied in any suitable form and organized within any suitable type of data structure. This operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but need not necessarily be, an electronic, magnetic, optical, electromagnetic, infrared, holographic, micromechanical, or semiconductor system, apparatus, or device, or any suitable combination of the foregoing.

A non-exhaustive list of more specific examples of the storage device would include the following: an electrical connection having one or more wires, a portable computer diskette, a hard disk, random access memory ("RAM"), read-only memory ("ROM"), erasable programmable read-only memory ("EPROM" or "Flash Memory"), portable compact disc read-only memory ("CD-ROM"), an optical storage device, a magnetic storage device, or any suitable combination of the foregoing. In the context of this document, a computer-readable storage medium may be any tangible medium that can contain or store a program for use by or in connection with an instruction execution system, apparatus, or device.

Code for carrying out operations for embodiments may be any number of lines and may be written in any combination of one or more programming languages including an object-oriented programming language such as Python, Ruby, Java, Smalltalk, C++, or similar, and conventional procedural programming languages, such as the "C" programming language or similar, and/or machine languages such as assembly languages. The code may be executed entirely or partly on the user's computer, as a stand-alone software package, partly on the user's computer and partly on a remote computer or entirely on the remote computer or server. In the very last scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment", "an embodiment", or similar language means that a particular feature, structure, or characteristic described in connection with the embodiment is included in at least one embodiment. Thus, appearances of the phrases "in one embodiment", "in an embodiment", and similar language throughout this specification may, but do not necessarily, all refer to the same embodiment, but mean "one or more but not all embodiments" unless expressly specified otherwise. The terms "including", "comprising", "having", and variations thereof mean "including but are not limited to", unless otherwise expressly specified. An enumerated listing of items does not imply that any or all of the items are mutually exclusive, otherwise unless expressly specified. The terms "a", "an", and "the" also refer to "one or more" unless otherwise expressly specified.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. Experts will recognize, however, that embodiments may be practiced without one or more of the specific details, or with other methods, components, materials, and so forth. In other instances, well-known structures, materials, or operations are not shown or described in detail to avoid obscuring any aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general purpose computer, special purpose computer, or other programmable data processing apparatus to produce a machine, such that the instructions, which are executed via the processor of the computer or other programmable data processing apparatus, create means for implementing the functions/acts specified in the schematic flowchart diagrams and/or schematic block diagrams for the block or blocks.

The code may also be stored in a storage device that can direct a computer, other programmable data processing apparatus, or other devices, to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices, to cause a series of operational steps to be performed on the computer, other programmable apparatus or other devices to produce a computer implemented process such that the code executed on the computer or other programmable apparatus provides processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that in some alternative implementations, the functions noted in the block may occur out of the order noted in the Figures. For example, two blocks shown in succession may substantially be executed concurrently, or the blocks may sometimes be executed in the reverse order, depending upon the functionality involved. Other steps and methods may be conceived that are equivalent in function, logic, or effect to one or more blocks, or portions thereof, to the illustrated Figures.

Although various arrow types and line types may be employed in the flowchart and/or block diagrams, they are understood not to limit the scope of the corresponding embodiments. Some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1 depicts an embodiment of a wireless communication system 100 for CBG-based retransmission. In one embodiment, the wireless communication system 100 includes remote units 102 and base units 104. Even though a specific number of remote units 102 and base units 104 are depicted in FIG. 1, it should be noted that any number of remote units 102 and base units 104 may be included in the wireless communication system 100.

In one embodiment, the remote units 102 may include computing devices, such as desktop computers, laptop computers, personal digital assistants ("PDAs"), tablet computers, smart phones, smart televisions (e.g., televisions connected to the Internet), set-top boxes, game consoles, security systems (including security cameras), vehicle on-board computers, network devices (e.g., routers, switches, modems), or the like. In some embodiments, the remote units 102 include wearable devices, such as smart watches, fitness bands, optical head-mounted displays, or the like. The remote units 102 may be referred to as subscriber units, mobiles, mobile stations, users, terminals, mobile terminals, fixed terminals, subscriber stations, UE, user terminals, a device, or by other terminology used in the field. The remote units 102 may communicate directly with one or more of the base units 104 via UL communication signals.

The base units 104 may be distributed over a geographic region. In certain embodiments, a base unit 104 may also be referred to as an access point, an access terminal, a base, a base station, a Node-B, an eNB, a gNB, a Home Node-B, a relay node, a device, or by any other terminology used in the field. The base units 104 are generally part of a radio access network that includes one or more controllers communicably coupled to one or more corresponding base units 104. The radio access network is generally communicably coupled to one or more core networks, which may be coupled to other networks, like the Internet and public switched telephone networks, among other networks. These and other elements of radio access and core networks are not illustrated but are well known generally by those having ordinary skill in the field.

In one implementation, the wireless communication system 100 is compliant with the 3GPP 5G new radio (NR). More generally, however, the wireless communication system 100 may implement some other open or proprietary communication protocol, for example, WiMAX, among other protocols.

The base units 104 may serve a number of remote units 102 within a serving area, for example, a cell or a cell sector via a wireless communication link. The base units 104 transmit DL communication signals to serve the remote units 102 in the time, frequency, and/or spatial domain.

Figure 2:
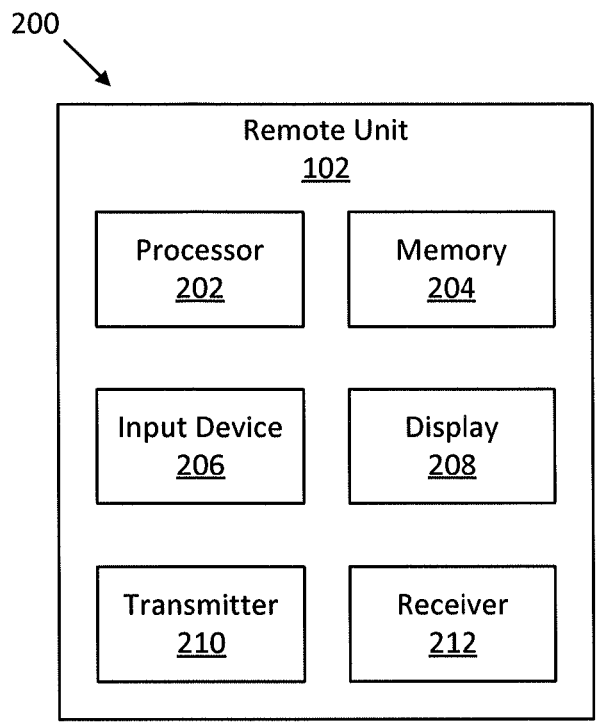
FIG. 2 is a schematic block diagram illustrating one embodiment of an apparatus that may be used for retransmitting uplink control information.

FIG. 2 depicts one embodiment of an apparatus 200 that may be used for CBG-based retransmission. The apparatus 200 includes one embodiment of the remote unit 102. Furthermore, the remote unit 102 may include a processor 202, a memory 204, an input device 206, a display 208, a transmitter 210, and a receiver 212. In some embodiments, the input device 206 and the display 208 are combined into a single device, such as a touchscreen. In certain embodiments, the remote unit 102 may not include any input device 206 and/or display 208. In various embodiments, the remote unit 102 may include at least one of the processor 202, the memory 204, the transmitter 210 and the receiver 212, and may not include the input device 206 and/or the display 208.

The processor 202, in one embodiment, may include any known controller capable of executing computer-readable instructions and/or capable of performing logical operations. For example, the processor 202 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 202 executes instructions stored in the memory 204 to perform the methods and routines described herein. The processor 202 is communicatively coupled to the memory 204, the input device 206, the display 208, the transmitter 210, and the receiver 212.

The memory 204, in one embodiment, is a computer readable storage medium. In some embodiments, the memory 204 includes volatile computer storage media. For example, the memory 204 may include RAM, including dynamic RAM ("DRAM"), synchronous dynamic RAM ("SDRAM"), and/or static RAM ("SRAM"). In some embodiments, the memory 204 includes non-volatile computer storage media. For example, the memory 204 may include a hard disk drive, flash memory, or any other suitable non-volatile computer storage device. In some embodiments, the memory 204 includes both volatile and non-volatile computer storage media. In some embodiments, the memory 204 stores data relating to system parameters. In some embodiments, the memory 204 also stores program code and related data, such as an operating system or other controller algorithms operating on the remote unit 102.

The input device 206, in one embodiment, may include any known computer input device including a touch panel, a button, a keyboard, a stylus, a microphone, or the like. In some embodiments, the input device 206 may be integrated with the display 208, for example, as a touchscreen or similar touch-sensitive display. In some embodiments, the input device 206 includes a touchscreen such that text may be input using a virtual keyboard displayed on the touchscreen and/or by handwriting on the touchscreen. In some embodiments, the input device 206 includes two or more different devices, such as a keyboard and a touch panel.

The display 208, in one embodiment, may include any known electronically controllable display or display device. The display 208 may be designed to output visual, audible, and/or haptic signals. In some embodiments, the display 208 includes an electronic display capable of outputting visual data to a user. For example, the display 208 may include, but is not limited to, an LCD display, an LED display, an OLED display, a projector, or similar display device capable of outputting images, text, or the like to a user. As another, non-limiting example, the display 208 may include a wearable display such as a smart watch, smart glasses, a heads-up display, or the like. Further, the display 208 may be a component of a smart phone, a personal digital assistant, a television, a table computer, a notebook (laptop) computer, a personal computer, a vehicle dashboard, or the like.

In certain embodiments, the display 208 includes one or more speakers for producing sound. For example, the display 208 may produce an audible alert or notification (e.g., a beep or chime). In some embodiments, the display 208 includes one or more haptic devices for producing vibrations, motion, or other haptic feedback. In some embodiments, all or portions of the display 208 may be integrated with the input device 206. For example, the input device 206 and display 208 may form a touchscreen or similar touch-sensitive display. In other embodiments, the display 208 may be located near the input device 206.

The transmitter 210 is used to provide UL communication signals to the base unit 104 and the receiver 212 is used to receive DL communication signals from the base unit 104. In various embodiments, the receiver 212 may be used to receive the broadcast signal. Although only one transmitter 210 and one receiver 212 are illustrated, the remote unit 102 may have any suitable number of transmitters 210 and receivers 212. The transmitter 210 and the receiver 212 may be any suitable type of transmitters and receivers. In one embodiment, the transmitter 210 and the receiver 212 may be part of a transceiver.

Figure 3:
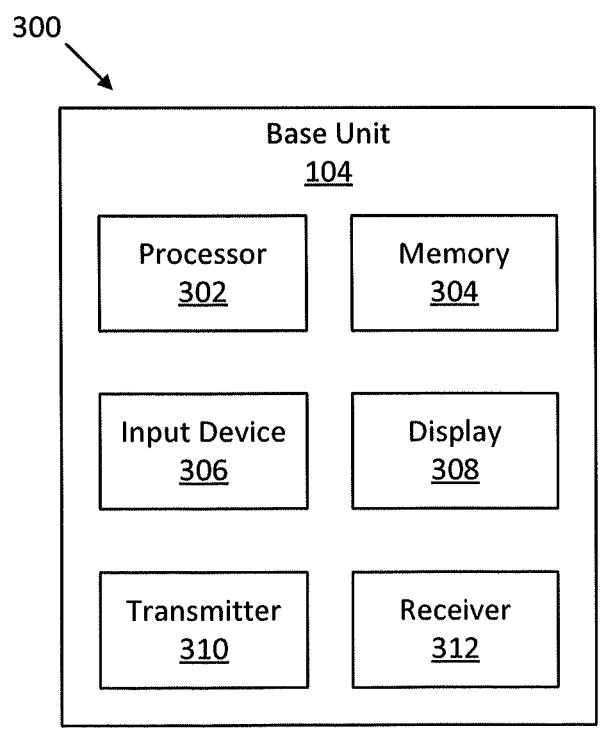
FIG. 3 is a schematic block diagram illustrating one embodiment of an apparatus that may be used for retransmitting uplink control information.

FIG. 3 depicts one embodiment of an apparatus 300 that may be used for CBG-based retransmission. The apparatus 300 includes one embodiment of the base unit 104. Furthermore, the base unit 104 may include at least one of a processor 302, a memory 304, an input device 306, a display 308, a transmitter 310 and a receiver 312. As may be appreciated, the processor 302, the memory 304, the input device 306, the display 308, the transmitter 310, and the receiver 312 may be substantially similar to the processor 202, the memory 204, the input device 206, the display 208, the transmitter 210, and the receiver 212 of the remote unit 102, respectively.

In various embodiments, the transmitter 310 is used to transmit signaling to the remote unit. Although only one transmitter 310 and one receiver 312 are illustrated, the base unit 104 may have any suitable number of transmitters 310 and receivers 312. The transmitter 310 and the receiver 312 may be any suitable type of transmitters and receivers. In one embodiment, the transmitter 310 and the receiver 312 may be part of a transceiver.

Figure 4:
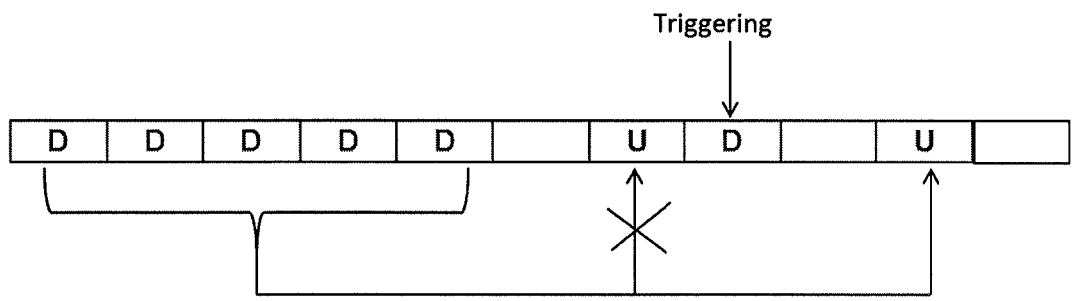
FIG. 4 is a schematic block diagram illustrating one embodiment of gNB-triggered HARQ-ACK reporting mechanism.

FIG. 4 is a schematic block diagram illustrating one embodiment of gNB-triggered HARQ-ACK reporting mechanism. In traditional reporting mechanism, when one HARQ-ACK feedback is failed to be decoded by the gNB due to either an LBT failure or a hidden node interference, the gNB can trigger retransmission of the HARQ-ACK feedback by a dedicated DCI or a DL grant/UL grant. In FIG. 4, the first transmission of the HARQ-ACK corresponding to the five DL transmissions is failed, then the gNB sends the triggering DCI in a following DL slot to trigger the retransmission of the HARQ-ACK feedback in an indicated UL slot. However, due to the restrictions on the processing capability for the UE, not all the DL transmissions can be responded with HARQ-ACK feedback, especially for the last several DL transmissions within the same COT. As a result, the HARQ-ACK feedback corresponding to those DL transmissions may have to be transmitted outside of the current COT.

Figure 5:
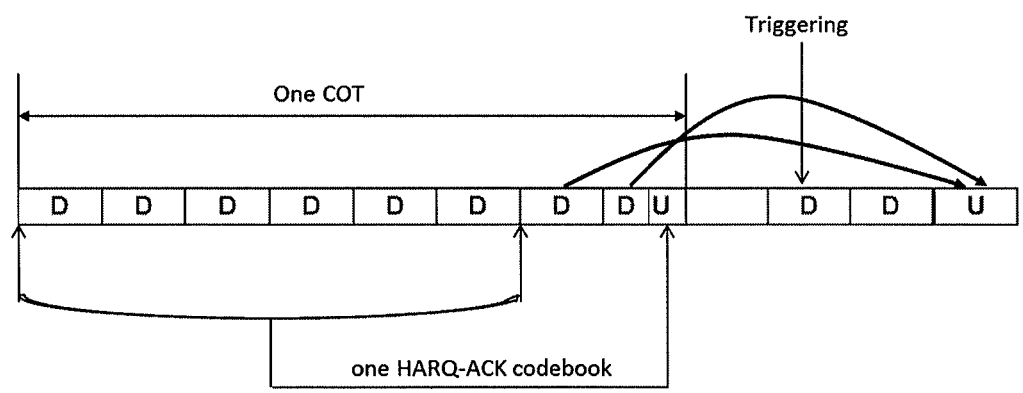
FIG. 5 is a schematic block diagram illustrating another embodiment of gNB-triggered HARQ-ACK reporting mechanism.

FIG. 5 is a schematic block diagram illustrating another embodiment of gNB-triggered HARQ-ACK reporting mechanism. In this embodiment, because of the limitations on the processing capability of the UE, the HARQ-ACK feedback corresponding to the last two DL transmissions cannot be transmitted in the end of the COT. At the same moment, the gNB cannot predict when the next COT is started. Therefore, at the time of the DL transmission, the gNB cannot schedule the transmission of the HARQ-ACK feedback corresponding to those two DL transmissions. Consequently, the gNB has to suspend transmission of HARQ-ACK feedback from the UE for those two DL transmissions, and triggers transmission of the HARQ-ACK feedback in a following slot by a triggering DCI. In this case, the gNB triggers the initial transmission of one HARQ-ACK codebook.

Below described is an exemplary process for retransmitting uplink control information. The gNB transmits downlink data (downlink transmissions) with transport blocks (TBs) on PDSCH. Multiple PDSCHs are configured in one downlink association set due to their corresponding HARQ-ACK feedback is transmitted in one UCI. In particular, one or two TBs may be transmitted in one PDSCH. In particular, in a single-codeword transmission, one TB is transmitted in one PDSCH, while in a two-codeword transmission, two TBs are transmitted in one PDSCH. Multiple PDSCHs may be transmitted in the time domain and/or in multiple component carriers. For example, if the downlink association set is configured with N slots and the number of configured carriers is C, and suppose that one TB is transmitted in one PDSCH, then N*C TBs would be transmitted in one downlink association set.

For each transmitted TB, the UE would transmit a HARQ-ACK on PUCCH or PUSCH back to the gNB to indicate whether or not the transmitted TB is successfully received at the UE. The HARQ-ACK may be Positive Acknowledgement (ACK), which means that the TB is correctly received at the UE, or Negative Acknowledgement (NACK), which means the TB is erroneously (i.e. not correctly) received at the UE. Therefore, for each TB, one bit may be used as the HARQ-ACK. Multiple HARQ-ACKs may be combined as a HARQ-ACK codebook to be transmitted together as a HARQ-ACK feedback. For example, in the condition that N*C TBs are transmitted in one downlink association set, a HARQ-ACK codebook (or HARQ-ACK feedback) with N*C bits for the downlink association set may be transmitted back to the gNB, in which each bit represents whether the corresponding each of the N*C TBs is successfully or erroneously received at the UE.

As described above, the UE, upon receiving the multiple TBs in a downlink association set (DAS), transmits a HARQ-ACK codebook (HARQ-ACK feedback) to the gNB to indicate whether the multiple TBs are correctly or erroneously received at the UE. The transmission of the HARQ-ACK feedback is included in an uplink control information (UCI) transmission. The UCI transmission is made according to HARQ-ACK timing indication and PUCCH resource indication in DL assignment.

Upon receiving the UCI, the gNB checks whether the UCI can be correctly decoded. In particular, the CRC of the UCI may be checked. If the UCI can be correctly decoded, i.e. the CRC check is passed, the gNB will further check each bit of the HARQ-ACK codebook, which is either ACK or NACK. For each of the NACKs contained in the HARQ-ACK codebook, the gNB will retransmit the corresponding TB indicated by the NACK. If the UCI cannot be correctly decoded, i.e. the CRC check is failed, the gNB sends a signaling to the UE to indicate that the UCI cannot be correctly decoded. The signaling may include downlink control information (DCI) for scheduling a retransmission of the UCI.

Traditionally, if the UCI cannot be correctly decoded, the gNB will have to retransmit all of the TBs (or CBGs) in the downlink association set corresponding to the HARQ-ACK feedback. This is not desirable.

In an embodiment, if the UCI cannot be correctly decoded, the gNB initiates a UCI retransmission by transmitting a DCI so that the UCI including the HARQ-ACK feedback can be retransmitted from the UE to the gNB. The failed CRC check of the UCI only indicates that the UCI is erroneously received at the gNB, but does not necessarily indicate that all of the TBs (or CBGs) in the downlink association set corresponding to the HARQ-ACK feedback are erroneously received at the UE. As mentioned before, there could be various reasons that may interfere with the transmission of UCI, which might cause that the UCI is erroneously received at the gNB. Therefore, it is extremely inefficient to retransmit all of the TBs (or CBGs) in the downlink association set only because the UCI cannot be decoded at the gNB.

Figure 6:
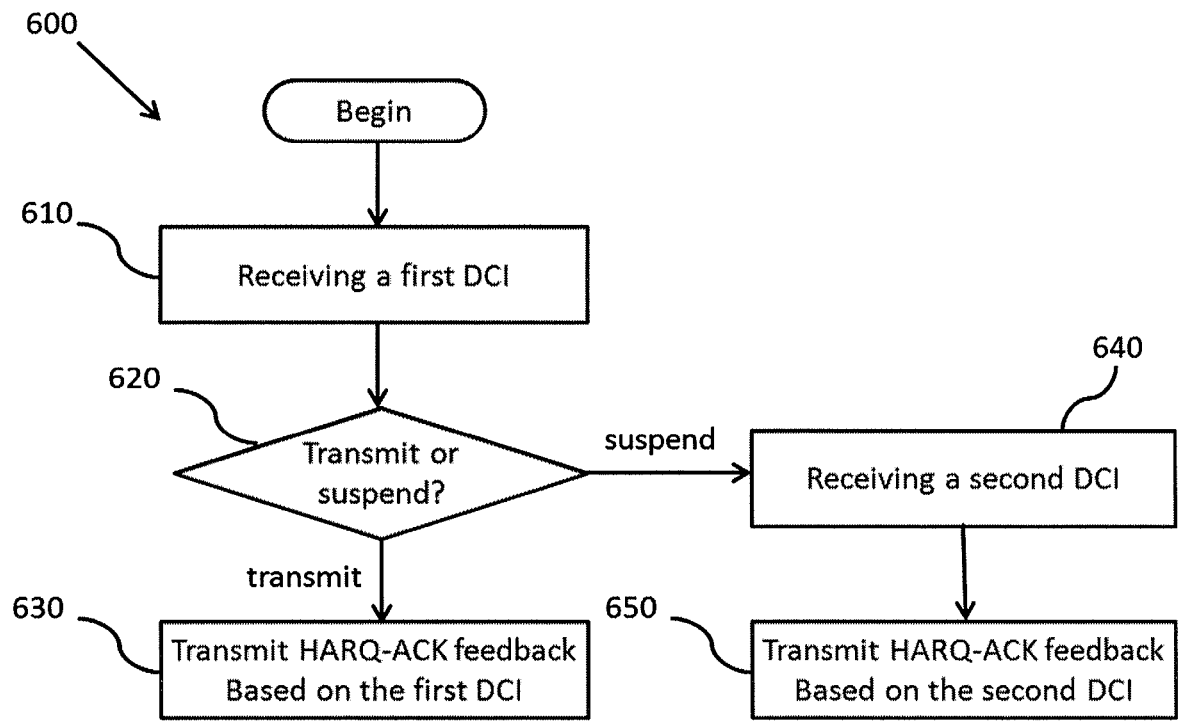
FIG. 6 is a schematic flow chart diagram illustrating a method for triggering HARQ-ACK feedback for a data transmission.

FIG. 6 is a schematic flow chart diagram illustrating a process for triggering HARQ-ACK feedback for a data transmission. In this process, in order to ensure proper transmission of the downlink data to the UE, a signaling by the gNB is sent to the UE in the form of a DCI for scheduling transmission of the downlink data. The DCI may include an indicator indicating to the UE to transmit HARQ-ACK feedback corresponding to the downlink data, for example a HARQ-ACK codebook indicating the transmission status of each of the Multiple PDSCHs of the downlink association set. Alternatively, and more importantly, the indicator of the DCI may also indicate to the UE to suspend HARQ-ACK feedback transmission corresponding to the downlink data, for example some or all of the Multiple PDSCHs in the downlink association set.

At step 610, the UE receives the DCI containing the indicator from the gNB. The UE further checks the DCI to determine whether to transmit or suspend the HARQ-ACK feedback transmission based on the information included in the indicator of the received DCI (step 620). If it is determined that the indicator of the DCI indicates to transmit the HARQ-ACK feedback, the UE proceeds to transmit, based on the information included in the DCI, the HARQ-ACK feedback for the downlink data, for example some or all of the Multiple PDSCHs in the downlink association set (Step 630). If it is determined that the indicator of the DCI indicates to suspend transmission of the HARQ-ACK feedback, the UE refrains from transmitting any HARQ-ACK feedback for the downlink data, but wait for further information from the gNB. Upon receiving from the gNB a next DCI for scheduling transmission of HARQ-ACK feedback, the UE proceeds to transmit, based on the information included in the next DCI, the HARQ-ACK feedback for the downlink data (Step 650).

In this disclosure, particular embodiments regarding gNB-triggered HARQ-ACK reporting are described for indicating the HARQ processes whose corresponding HARQ-ACK feedback is not received by the gNB or not correctly decoded by gNB.

Pending Indication for HARQ-ACK Feedback

In one embodiment, a specific value for pending indication in K1 set may be used to indicate suspension of the transmission of a HARQ-ACK feedback. Specifically, when it is necessary for the gNB to suspend a HARQ-ACK feedback from a UE corresponding to one DL transmission, the gNB may indicate the "pending indication" in a field for PDSCH-to-HARQ_feedback timing indicator in the DL grant sent to the UE; when it is necessary for the gNB to trigger the HARQ-ACK feedback from the UE, the gNB may indicate a valid PDSCH-to-HARQ_feedback timing indicator in the DL grant sent to the UE. Upon receiving the DL grant, the UE may determine whether to suspend or transmit HARQ-ACK feedback based on the specific value in the field of PDSCH-to-HARQ_feedback timing indicator. In some embodiments, the "pending indication" may be a new entry in the field for the PDSCH-to-HARQ_feedback timing indicator in the DL grant. For example, values as shown in the following table can be used for this purpose:

TABLE 1

Interpretation of PDSCH-to-HARQ_feedback timing indicator field

| PDSCH-to-HARQ_feedback timing indicator | Interpretation |
| --- | --- |
| '000' | Number of slots k: $1^{st}$ value provided by dl-DataToUL-ACK |
| '001' | Number of slots k: $2^{nd}$ value provided by dl-DataToUL-ACK |
| '010' | Number of slots k: $3^{rd}$ value provided by dl-DataToUL-ACK |
| '011' | Number of slots k: $4^{th}$ value provided by dl-DataToUL-ACK |

TABLE 1-continued

Interpretation of PDSCH-to-HARQ_feedback timing indicator field

| PDSCH-to-HARQ_feedback timing indicator | Interpretation |
| --- | --- |
| '100' | Number of slots k: $5^{th}$ value provided by dl-DataToUL-ACK |
| '101' | Number of slots k: $6^{th}$ value provided by dl-DataToUL-ACK |
| '110' | Number of slots k: $7^{th}$ value provided by dl-DataToUL-ACK |
| '111' | HARQ-ACK Feedback Suspension |

In another embodiment, an invalid value of PUCCH resource indicator for indicating suspension of the transmission of a HARQ-ACK feedback may be configured in the PUCCH resource set. When it is necessary for the gNB to suspend a HARQ-ACK feedback by the UE corresponding to one DL transmission, the gNB can indicate an invalid value in the field for the PUCCH resource indicator in the DL grant sent to UE. This indication may be achieved by explicitly tying one or more entries to an invalid PUCCH resource, to thereby indicate suspension of the HARQ-ACK feedback, which is shown in table 2 as presented below. Alternatively, one or more of the 8 entries in the resource List as shown in table 2 can indicate an invalid resource. When it is necessary for the gNB to trigger the HARQ-ACK feedback from the UE, the gNB may indicate a valid PUCCH resource indicator in the DL grant sent to the UE. Upon receiving the DL grant, the UE can determine to suspend the transmission of the HARQ-ACK feedback based on the value in the field for the PUCCH resource indicator, for example when the field has an invalid value. Alternatively, the UE can also determine to transmit the HARQ-ACK feedback based on the value in the field for the PUCCH resource indicator, for example when the field has a valid value.

TABLE 2

Interpretation of PUCCH resource indication field values

| PUCCH resource indicator | Interpretation |
| --- | --- |
| '000' | $1^{st}$ PUCCH resource provided by pucch-ResourceId obtained from the $1^{st}$ value of resourceList |
| '001' | $2^{nd}$ PUCCH resource provided by pucch-ResourceId obtained from the $2^{nd}$ value of resourceList |
| '010' | $3^{rd}$ PUCCH resource provided by pucch-ResourceId obtained from the $3^{rd}$ value of resourceList |
| '011' | $4^{th}$ PUCCH resource provided by pucch-ResourceId obtained from the $4^{th}$ value of resourceList |
| '100' | $5^{th}$ PUCCH resource provided by pucch-ResourceId obtained from the $5^{th}$ value of resourceList |
| '101' | $6^{th}$ PUCCH resource provided by pucch-ResourceId obtained from the $6^{th}$ value of resourceList |
| '110' | 7th PUCCH resource provided by pucch-ResourceId obtained from the $7^{th}$ value of resourceList |
| '111' | Invalid PUCCH resource; HARQ-ACK Feedback Suspension |

In another embodiment, the DCI may include a bit that indicates suspending (e.g., bit value of "0") or starting/ enabling (e.g., bit value of "1") the transmission of the HARQ-ACK feedback. When it is necessary for the gNB to suspend the HARQ-ACK feedback from the UE corresponding to one DL transmission, the gNB may indicate the corresponding bit value in the DL grant to the UE. When it is necessary for the gNB to trigger the HARQ-ACK feedback from the UE, the gNB may indicate the corresponding bit value in the DL grant sent to the UE. Upon receiving the DL grant, the UE may determine to suspend the transmission of the HARQ-ACK feedback based on a specific bit value in the received DL grant, for example a bit value of "0". Alternatively, the UE can also determine to transmit the HARQ-ACK feedback based on a different bit value in the received DL grant, for example a bit value of "1".

In yet another embodiment, total DAI can be reinterpreted to be the total number of PDCCH monitoring occasions in which PDSCH receptions or SPS PDSCH release associated with DCI format 1_0 or DCI format 1_1 is present and their corresponding HARQ-ACK information bits are transmitted in a same HARQ-ACK codebook. Total DAI may be included in each DCI format 1_0 or DCI format 1_1. The value of total DAI can be the same for all the DL transmissions whose corresponding HARQ-ACK feedback is transmitted in the same HARQ-ACK codebook. When the UE determines that the value of the latest counter DAI is not equal to the value of total DAI, the UE may suspend transmission of the HARQ-ACK feedback. When the UE determines that the value of the latest counter DAI is equal to the value of total DAI, the UE may start transmission of the HARQ-ACK feedback. Upon receiving the DL grant, the UE may thereby determine to either suspend or transmit the HARQ-ACK feedback based on the values of counter DAI and total DAI.

HARQ Processes With Corresponding HARQ-ACK Feedback

In one embodiment, a HARQ-ACK codebook index (HCI) may be included in each DL grant. The value of the HCI may be updated from one HARQ-ACK codebook to another. In order for the UE to determine the bit length of the HCI, a maximum number of HARQ-ACK codebooks allowable for one UE may be configured by RRC signaling. The bit length of the HCI may be accordingly calculated via the function of ceil(log 2(max number of HARQ-ACK codebooks). In another embodiment, the bit length of the HCI may be RRC configured or fixed. If two bits are used for indicating the HCI, then the four values of 0, 1, 2, 3 may be used for the HCI indication and a fifth HCI value can be reset to 0. In both alternatives, all the DL transmissions with a corresponding HARQ-ACK feedback transmitted in the same HARQ-ACK codebook should be indicated with the same value for the HCI. In order to trigger retransmission of a HARQ-ACK codebook due to an LBT failure or incorrect decoding, or an initial transmission of another HARQ-ACK codebook indicated as pending, the triggering DCI may indicate the corresponding HCl value. In this way, the UE enabled to transmit the HARQ-ACK codebook in the indicated PUCCH resource.

In another embodiment, when multiple consecutive HARQ processes are transmitted in the same HARQ-ACK codebook, the process ID of the starting HARQ process and number of consecutive HARQ processes may be indicated in the triggering DCI. Based on such information in the received DCI, the UE may be enabled to transmit, or some occasions, retransmit, the bits for the HARQ-ACK feedback corresponding to the indicated HARQ processes. In one embodiment, the process ID of the starting HARQ process and the number of HARQ processes may be separately indicated in the triggering DCI. Since the maximum number of HARQ processes is 16, only four bits can be used to indicate the process ID of the starting HARQ process and another four bits can be used to indicate the number of consecutive HARQ processes. In another embodiment, the process ID of the starting HARQ process and the number of HARQ processes are jointly coded in the triggering DCI for indicating the HARQ processes. Since the maximum number of HARQ processes is 16, eight bits would be enough to indicate the process ID of the starting HARQ process and the number of consecutive HARQ processes.

Triggering HARQ-ACK Feedback Beyond the Current COT

Figure 7:
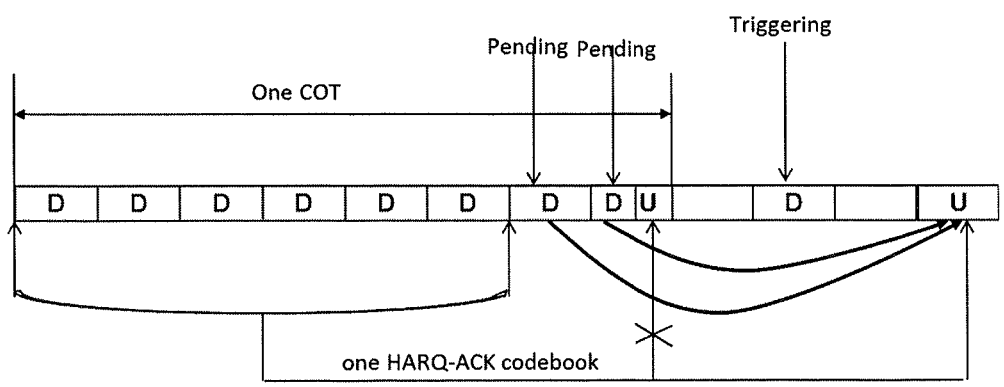
FIG. 7 is a schematic block diagram illustrating yet another embodiment of gNB-triggered HARQ-ACK reporting mechanism.

In some embodiments, there can be situations where one self-contained HARQ-ACK codebook (namely, the DL transmissions and the corresponding HARQ-ACK feedback are transmitted in the same COT) for most DL transmissions are not transmitted due to an LBT failure or not correctly decoded at the gNB side, and the last several DL transmissions within a COT cannot be acknowledged in the same COT and have already been indicated in a previous DCI to suspend transmission of the corresponding HARQ-ACK feedback. An exemplary situation is illustrated detail in FIG. 7, which shows another embodiment of gNB-triggered HARQ-ACK reporting mechanism. In this exemplary situation, the gNB triggers the retransmission of a failed HARQ-ACK codebook and initial transmission of pending HARQ-ACK codebook. Specifically, the first six DL transmissions in the COT may be acknowledged by a UL transmission in the same COT, but it is not possible for the two DL transmissions marked as "pending" to be acknowledged within the same COT. If the HARQ-ACK codebook for the first six DL transmissions also failed to be transmitted via the self-contained UL transmission in the COT due to an LBT failure or not correctly decoded at the gNB side, a triggering DCI can be sent by the gNB not only for requesting retransmission of the HARQ-ACK codebook for the first six DL transmissions, but also for triggering the HARQ-ACK feedback via another HARQ-ACK codebook for the two pending DL transmissions whose HARQ-ACK feedback cannot be transmitted in the same COT.

In one embodiment, the two HARQ-ACK codebooks, respectively for the first six DL transmissions and for the last two pending DL transmissions, may be concatenated and transmitted in one UCI. The retransmitted self-contained HARQ-ACK codebook may be placed first, followed by the pending HARQ-ACK codebook. In this situation, the retransmitted HARQ-ACK codebook for the first six DL transmissions is re-encoded with the pending HARQ-ACK codebook for the trailing two DL transmissions in the same COT.

In another embodiment, the two HARQ-ACK codebooks may be transmitted in two separate PUCCHs. In this situation, the triggering DCI may include separate PUCCH resource indicators for the two HARQ-ACK codebooks. As a result, the retransmitted HARQ-ACK codebook is not necessary re-encoded with the pending HARQ-ACK codebook.

Through the above approach of triggering HARQ-ACK feedback beyond the same COT, the UE and the gNB can synchronize the HARQ processes which require retransmission of one HARQ-ACK codebook and/or initial transmission of another HARQ-ACK codebook.

LBT Indication for Transmission of HARQ-ACK Feedback

In some embodiments, an LBT type, i.e., one shot LBT with at least 25 us sensing interval (also named type 2 UL channel access procedure in 3GPP Rel-14 TS36.213) or LBT Cat. 4 with a random backoff counter selected from a variable contention window (also named type 1 UL channel access procedure in 3GPP Rel-14 TS36.213), can be indicated in the DL grant sent by the UE. In one embodiment, the UE may expect that the LBT type is the same for all the DL transmissions whose corresponding HARQ-ACK feedback is transmitted in the same HARQ-ACK codebook. In another embodiment, the LBT type in the latest DL grant can be used for performing LBT for HARQ-ACK transmission.

In some embodiments, an LBT priority class can be indicated in the DL grant. One example on LBT priority class is shown in below Table 1. Each LBT priority class defines a contention window for a certain COT. In one embodiment, the UE may expect that the LBT priority class is the same for all the DL transmissions whose corresponding HARQ-ACK feedback is transmitted in the same HARQ-ACK codebook. In another embodiment, the LBT priority class in the latest DL grant can be used for performing LBT for transmission of HARQ-ACK feedback.

TABLE 3

Channel Access Priority Class for UL

| Channel Access Priority Class (p) | $m_p$ | $CW_{min,p}$ | $CW_{max,p}$ | $T_{ulm\ cot,p}$ | allowed $CW_p$ sizes |
|---|---|---|---|---|---|
| 1 | 2 | 3 | 7 | 2 ms | {3,7} |
| 2 | 2 | 7 | 15 | 4 ms | {7,15} |
| 3 | 3 | 15 | 1023 | 6 ms or 10 ms | {15,31,63,127 255,511,1023} |
| 4 | 7 | 15 | 1023 | 6 ms or 10 ms | {15,31,63,127, 255,511,1023} |

NOTE1:
For D
A = 3,4, $T_{ulm\ cot,p}$ = 10 ms if the higher layer parameter 'absenceOfAnyOtherTechnology-r14' indicates TRUE, otherwise, $T_{ulm\ cot,p}$ = 6 ms.
NOTE 2:
When $T_{ulm\ cot,p}$ = 6 ms it may be increased to 8 ms by inserting one or more gaps. The minimum duration of a gap shall be 100 μs. The maximum duration before including any such gap shall be 6 ms..

feedback, an exemplary method may comprise: receiving a DCI for scheduling a data transmission, wherein the DCI includes a field for indicating LBT type for transmission of a HARQ-ACK feedback; performing LBT for transmitting the HARQ-ACK feedback for the data transmission using the LBT type indicated in the received DCI. The LBT type indicated in the DCI may be the same for all the DL transmissions of the data transmission, or may be an LBT type in a latest DL transmission of the data transmission.

Another exemplary method may comprise: receiving a DCI for scheduling a data transmission, wherein the DCI includes a field for indicating LBT priority class for transmission of a HARQ-ACK feedback; performing LBT for transmitting the HARQ-ACK feedback for the data transmission using the LBT type indicated in the received DCI. The LBT priority class indicated in the DCI may be the same for all the DL transmissions of the data transmission, or may be an LBT priority class in a latest DL transmission of the data transmission.

Embodiments may be practiced in other specific forms. The described embodiments are to be considered in all respects to be only illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method performed by a user equipment (UE) the method comprising:
   receiving a first downlink control information from a base station for scheduling a downlink transmission, wherein the first downlink control information includes a feedback timing indicator field having a first value, the first value indicating to temporarily suspend transmission of a hybrid automatic repeat request acknowledgement (HARQ-ACK) feedback corresponding to the downlink transmission;
   determining, based at least in part on the first value, to suspend HARQ-ACK feedback and wait for a second downlink control information;
   refraining, in response to determining to suspend HARQ-ACK feedback, from transmitting any HARQ-ACK feedback;
   receiving, subsequent to receiving the first downlink control information and determining to suspend HARQ-ACK feedback, the second downlink control information from the base station for scheduling the transmission of the suspended HARQ-ACK feedback corresponding to the downlink transmission, wherein:
      the second downlink control information includes a feedback timing indicator field having a second value different from the first value;
      the second value indicates a slot for the transmission of the suspended HARQ-ACK feedback corresponding to the downlink transmission; and
      the second value comprises a positive numerical value; and
   transmitting, in response to receiving the second downlink control information, the suspended HARQ-ACK feedback corresponding to the downlink transmission to the base station on the slot indicated by the second downlink control information.

2. The method of claim 1, wherein the feedback timing indicator indicates a predefined hybrid automatic repeat request timing value for suspending the transmission of the HARQ-ACK feedback.

3. The method of claim 1, wherein the feedback timing indicator indicates a predefined physical uplink control channel resource for suspending the transmission of the HARQ-ACK feedback.

4. The method of claim 1, wherein the first value comprises one bit for indicating suspension of the transmission of the HARQ-ACK feedback.

5. The method of claim 1, wherein the feedback timing indicator comprises a counter downlink assignment index and a total downlink assignment index and the determining to suspend the transmission of the HARQ-ACK feedback is in response to a value of counter downlink assignment index being smaller than a value of total downlink assignment index.

6. The method of claim 1, wherein the first downlink control information includes a HARQ-ACK codebook index.

7. The method of claim 6, wherein a bit length of the HARQ-ACK codebook index is determined based on radio resource control signaling.

8. The method of claim 6, wherein the second downlink control information includes the HARQ-ACK codebook index for scheduling transmission of the corresponding HARQ-ACK codebook.

9. The method of claim 1, wherein the second downlink control information schedules transmission of a HARQ-ACK feedback for a hybrid automatic repeat request process by indicating the corresponding hybrid automatic repeat request process identifier of the hybrid automatic repeat request process in the second downlink control information.

10. The method of claim 9, wherein the second downlink control information includes one field for indicating a starting hybrid automatic repeat request process identifier and another field for indicating a number of contiguous hybrid automatic repeat request processes.

11. The method of claim 9, wherein the second downlink control information includes one field for indicating a starting hybrid automatic repeat request process identifier and a number of contiguous hybrid automatic repeat request processes.

12. The method of claim 1,
wherein the HARQ-ACK feedback is included in a first HARQ-ACK codebook and the transmission of the first HARQ codebook is suspended in response to the first value indicating to suspend the first HARQ-ACK codebook; and
wherein the second downlink control information schedules the transmission of the first HARQ-ACK codebook and retransmission of a second HARQ-ACK codebook,
wherein the transmission of the second HARQ-ACK codebook was not correctly received by the base station.

13. The method of claim 12, wherein the first and second HARQ-ACK codebooks are transmitted in one uplink control information.

14. The method of claim 12, wherein the first and second HARQ-ACK codebooks are transmitted in two separate uplink control informations.

15. The method of claim 1, wherein the first downlink control information includes a field for indicating listen-before-talk type for the transmission of the HARQ-ACK feedback.

16. The method of claim 1, wherein the first downlink control information includes a field for indicating listen-before-talk priority class for the transmission of the HARQ-ACK feedback.

17. The method of claim 1, wherein the second downlink control information includes a field for indicating listen-before-talk type for the transmission of the HARQ-ACK feedback.

18. A method performed by a base station, the method comprising:
transmitting a first downlink control information from a base station for scheduling a downlink transmission, wherein the first downlink control information includes a feedback timing indicator field having a first value, the first value indicating to temporarily suspend transmission of a hybrid automatic repeat request acknowledgement (HARQ-ACK) feedback corresponding to the downlink transmission;
transmitting, subsequent to transmitting the first downlink control information, a second downlink control information for scheduling the transmission of the HARQ-ACK feedback, wherein the second downlink control information includes a feedback timing indicator field having a second value different from the first value;
the second value indicates a slot for the transmission of a suspended HARQ-ACK feedback corresponding to the downlink transmission; and
the second value comprises a positive numerical value; and
receiving, in response to transmitting the second downlink control information, the suspended HARQ-ACK feedback corresponding to the downlink transmission transmitted on the slot indicated by the second downlink control information.

19. A user equipment (UE) comprising:
At least one memory; and
At least one processor coupled with at least one memory and configured to cause the UE to:
receive a first downlink control information from a base station for scheduling a downlink transmission, wherein the first downlink control information includes a feedback timing indicator field having a first value, the first value indicating to temporarily suspend transmission of a hybrid automatic repeat request acknowledgement (HARQ-ACK) feedback corresponding to the downlink transmission;
determine, based at least in part on the first value, to suspend HARQ-ACK feedback and wait for a second downlink control information;
refrain, in response to determining to suspend HARQ-ACK feedback, from transmitting any HARQ-ACK feedback;
receive, subsequent to receiving the first downlink control information and determining to suspend HARQ-ACK feedback, the second downlink control information from the base station for scheduling the transmission of the suspended HARQ-ACK feedback corresponding to the downlink transmission, wherein:
the second downlink control information includes a feedback timing indicator field having a second value different from the first value;
the second value indicates a slot for the transmission of the suspended HARQ-ACK feedback corresponding to the downlink transmission; and
the second value comprises a positive numerical value; and
transmit, in response to receiving the second downlink control information, the suspended HARQ-ACK feedback corresponding to the downlink transmission to the base station on the slot indicated by the second downlink control information.

20. A base station, comprising:
At least one memory; and
At least one processor coupled with at least one memory and configured to cause the base station to:
transmit a first downlink control information from a base station for scheduling a downlink transmission, wherein the first downlink control information includes a feedback timing indicator field having a first value, the first value indicating to temporarily suspend transmission of a hybrid automatic repeat request acknowledgement (HARQ-ACK) feedback corresponding to the downlink transmission;
transmit, subsequent to transmitting the first downlink control information, a second downlink control information for scheduling the transmission of the HARQ-ACK feedback, wherein the second downlink control information includes a feedback timing indicator field having a second value different from the first value;

the second value indicates a slot for the transmission of a suspended HARQ-ACK feedback corresponding to the downlink transmission; and the second value comprises a positive numerical value; and receive, in response to transmitting the second downlink control information, the suspended HARQ-ACK feedback corresponding to the downlink transmission transmitted on the slot indicated by the second downlink control information.

\* \* \* \* \*